Nov. 30, 1948.  G. L. COLEMAN  2,454,992
APPARATUS FOR RE-SURFACING MEAT BLOCKS
Filed June 16, 1945  4 Sheets-Sheet 1
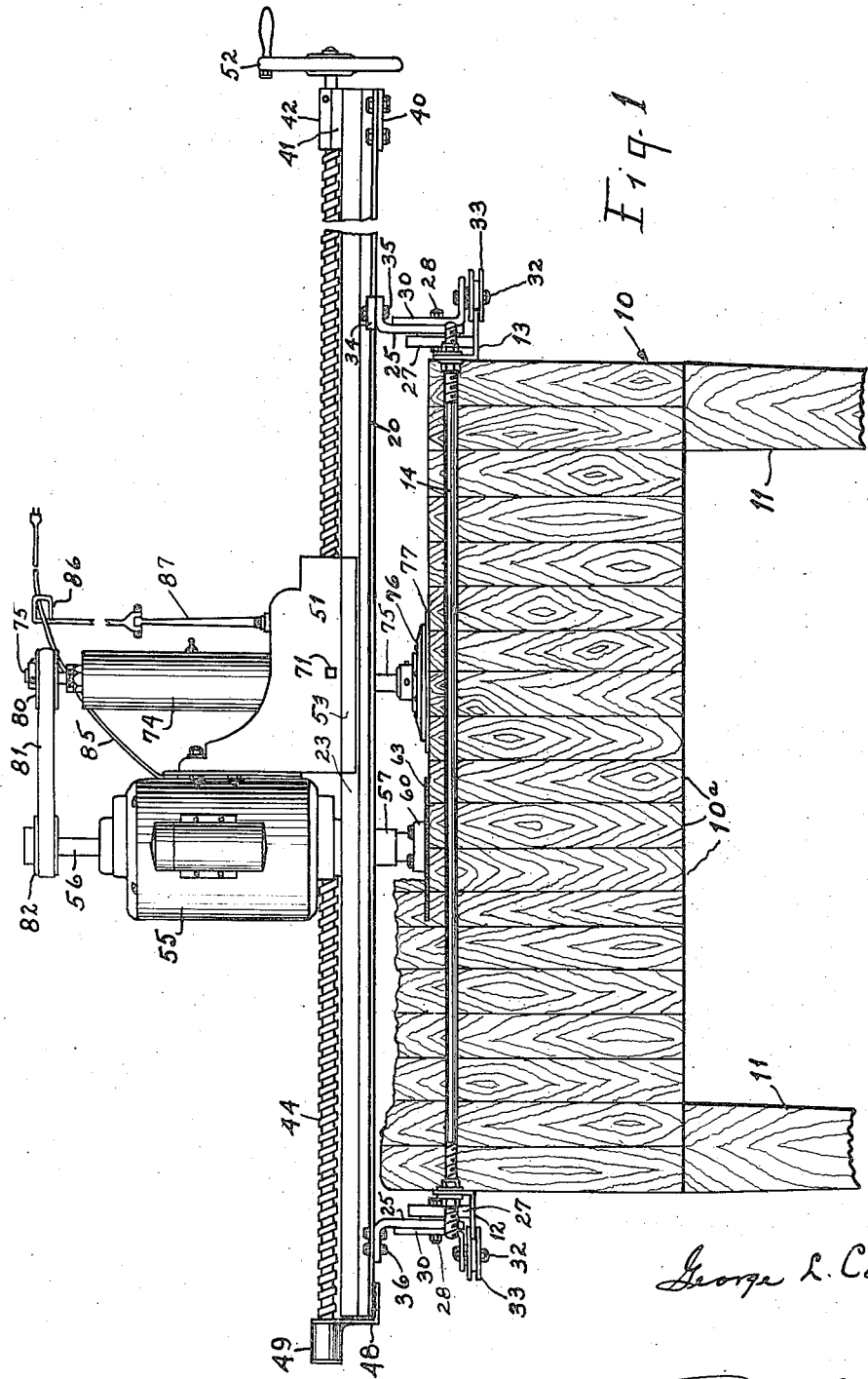
George L. Coleman
Inventor
By Paul Eaton
Attorney

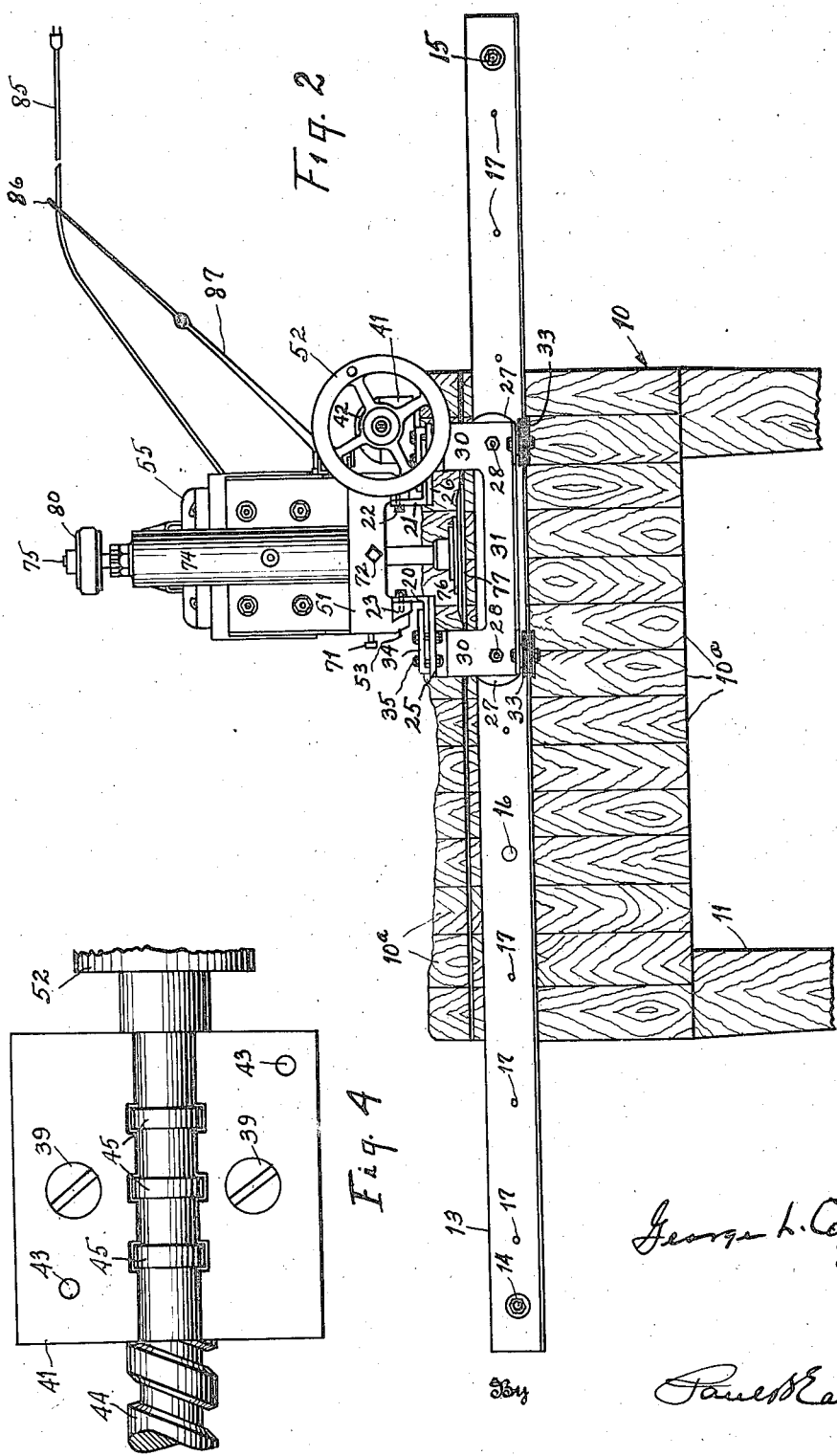

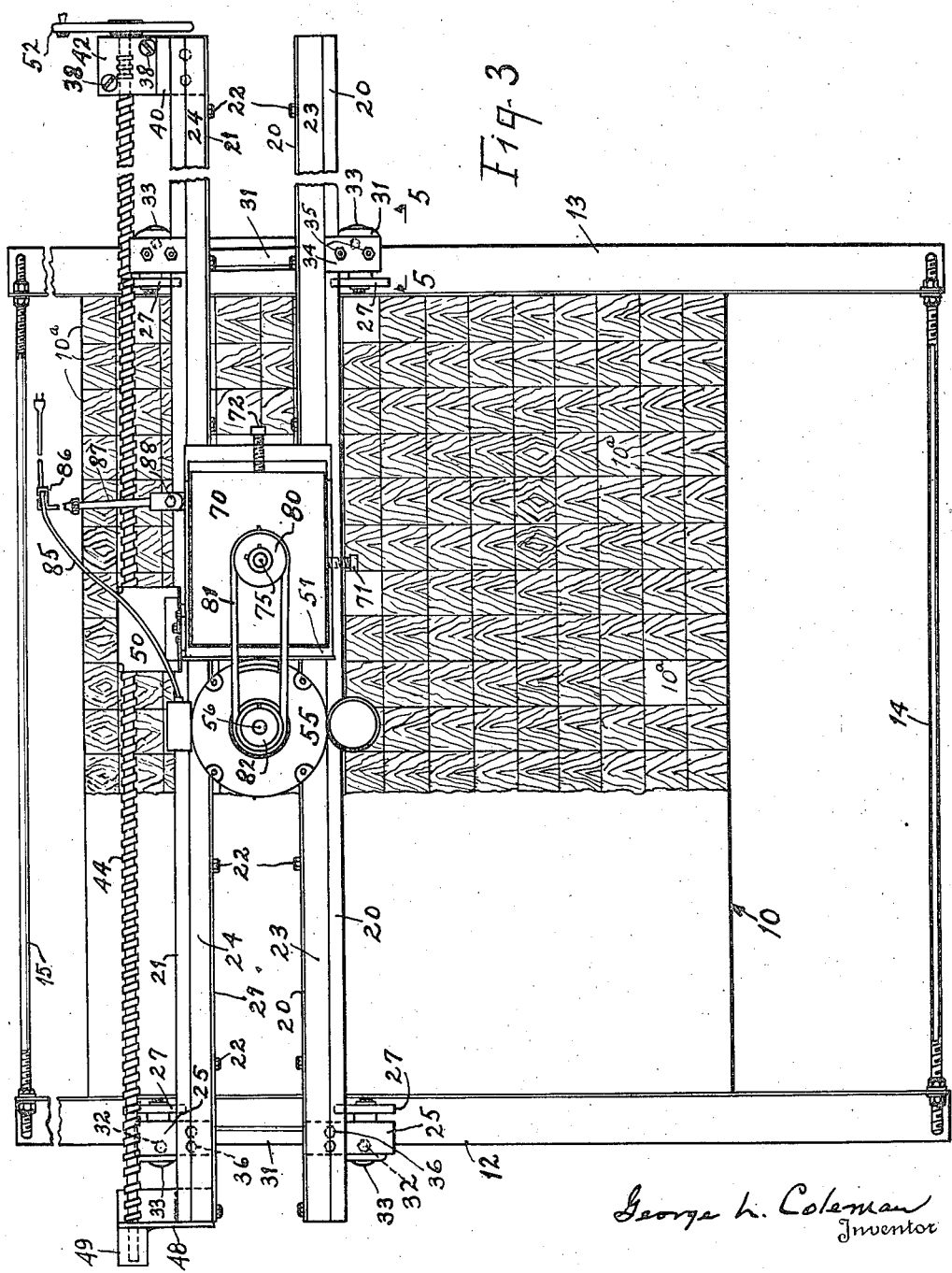

Nov. 30, 1948.　　　　　　G. L. COLEMAN　　　　　　2,454,992
APPARATUS FOR RE-SURFACING MEAT BLOCKS
Filed June 16, 1945　　　　　　　　　　　　　4 Sheets-Sheet 4
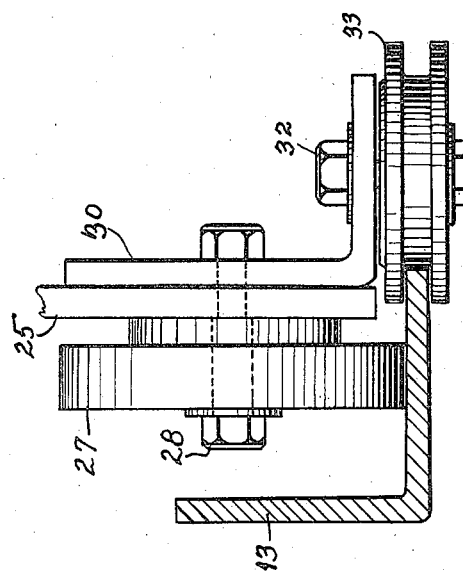
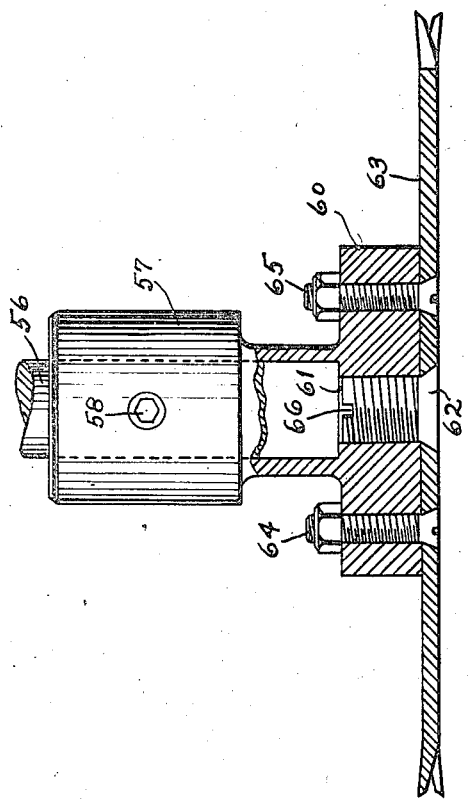
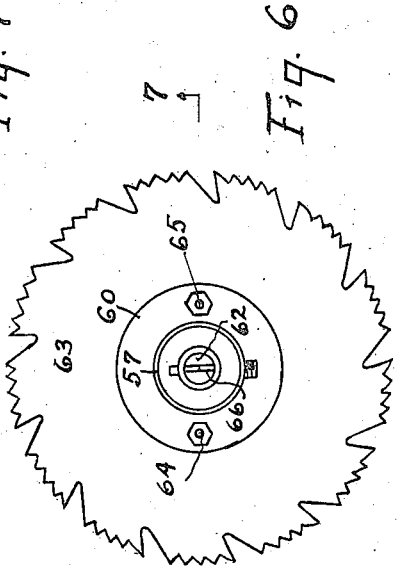

Patented Nov. 30, 1948

2,454,992

UNITED STATES PATENT OFFICE 2,454,992

APPARATUS FOR RESURFACING MEAT BLOCKS

George L. Coleman, Fayetteville, N. C., assignor of one-half to William O. Huske, Fayetteville, N. C.

Application June 16, 1945, Serial No. 599,848

1 Claim. (Cl. 144—2)

This invention relates to a machine for resurfacing meat blocks and the like and comprises a trackway attachable to opposed sides of the meat block and embodying a carriage carried by the trackway and said carriage having mounted thereon a cutting tool such as a saw and if desired an abrasive tool such as a sand wheel whereby the top portion of the meat block can be cut away to provide a perfectly smooth plane surface so that the meat block will have an upper surface just as good as it originally had when new.

Meat blocks as used in markets are composed of a plurality of pieces of wood usually rectangular in cross section which are firmly secured to each other and occupy a vertical position with relation to each other. This block has suitable legs for supporting it a suitable distance above the floor of the market and the upper surface of this meat block is employed for cutting meat. In using a cleaver and other cutting tools cutting into the upper surface of the meat block, it is gradually worn away and pitted, not only presenting an uneven surface but also a surface which is full of fine seams from the meat knife cutting into the block and thus soon becomes unsanitary as blood and pieces of meat are forced into these cracks and crevices formed by the knife, thus making it impossible to thoroughly cleanse the working surface of the meat block.

It is an object of this invention to provide an apparatus that can be mounted on a meat block and having a cutting tool for sawing the top of the meat block away and providing a new upper or operating surface for the meat block.

It is another object of this invention to provide a tool for re-surfacing meat blocks by cutting away the upper portion of the meat block and sanding this new surface to thus provide a new plane surface for the upper side of the meat block.

Some of the objects of the invention having been stated, other objects will appear as the description proceeds when taken in connection with the accompanying drawings in which—

Figure 1 is a side elevation of the apparatus showing it installed on a meat block;

Figure 2 is an end elevation of the apparatus looking from the right hand side of Figure 1;

Figure 3 is a top plan view of the apparatus showing it installed on a meat block;

Figure 4 is a top plan view of the upper right hand portion of Figure 3 showing the manner of mounting one end of the screw for feeding the saw carriage along the trackway on which it is mounted;

Figure 5 is a view partly in section and partly in elevation taken along the line 5—5 in Figure 3 and showing only the lower portion of the apparatus at this point;

Figure 6 is a top plan view of the cutting saw, showing it removed from the motor shaft;

Figure 7 is a cross sectional view on an enlarged scale through the saw and taken along the line 7—7 in Figure 6.

Referring more specifically to the drawings, the numeral 10 indicates a meat block which is usually made up of a plurality of vertically disposed square pieces of wood 10a. This has joined thereto suitable legs 11 for supporting it on the floor of the meat market in which this meat block is usually employed. The upper surface of this meat block is employed by placing pieces of meat thereon and, by means of a cleaver, cutting the meat into smaller portions for delivery to customers. This results in portions of the upper surface of the meat block being dug away, forming cavities and uneven surfaces which renders the meat block not only unsanitary but also renders it unfit for proper cutting on account of not having a smooth upper surface. I take a pair of angle irons 12 and 13 and after leveling them properly I secure these in clamping relation to opposed sides of the meat block a substantial distance down on the side by means of suitable tie bolts 14 and 15. After the angle iron trackways 12 and 13 have been firmly secured to the meat block, I can additionally secure the tracks 12 and 13 to the meat block, to prevent being moved upwardly or downwardly, by means of suitable nails 16 being driven into the meat block through holes 17 in the vertical legs of the angle iron members 12 and 13.

The horizontal legs of each of the trackways 12 and 13 are adapted to support suitable carriages which in turn support a trackway for the cutting tool for re-surfacing the upper surface of the meat block. These trackways for supporting the cutting tool comprise angle members 20 and 21 to the outer surfaces of which are secured by means of suitable bolts 22, suitable dove tailed guides 23 and 24. The horizontal legs of angle irons 21 and 22 are supported by suitable angle brackets 25 and 26 at one end, said angle brackets having vertically disposed legs, each of which is penetrated by a bolt 28 which is shouldered and on the enlarged portion of which is rotatably mounted a wheel 27 which rolls on the horizontal portion of trackway 13. This bolt 28 on which wheel 27 is rotatably mounted also penetrates an upstanding leg 30 of a U-shaped angle bracket 31 which in its horizontal portion has mounted on bolts 32 grooved wheels 33 which engage the outer edge of the horizontal portion of trackway 13. A clamping member 34 is bolted to the horizontal portion of angle bracket 25 and clampingly engages the horizontal leg portion of angle members 20 and 21. The clamps 34 are secured in position by means of suitable bolts 35 penetrating the horizontal portion of angle bracket 25. The description given for one side of this carriage assembly is identical to the other end and like reference characters will apply.

As to the other end of the carriage which is associated with trackway 12, like reference characters apply to all parts except that instead of an angle bracket 25 being clampingly secured to the horizontal portions of trackways 20 and 21 by means of bolts 35 and clamp 34, the upper horizontal leg portion of bracket 25 is bolted directly through the horizontal portions of trackways 20 and 21 by means of bolts 36.

Secured on the lower surface of trackway 21 is a strap iron member 40 which has a bearing block 41 mounted thereon by means of screws 39 with a cap 42 secured on top of same by means of suitable screws 38 penetrating suitable holes 43 in the bearing block 41 (see Figures 3 and 4). This bearing block is adapted to rotatably support one end of a screw-threaded shaft 44, which has a plurality of enlargements 45 thereon, which are suitably housed in enlargements in the cavity of bearing block 41. To the other end of the trackway 21 there is likewise secured a bracket 48 which has a bearing block 49 secured to the outer surface of the vertical leg portion of the angle bracket 48 in which the smooth end of screw threaded rod 44 is rotatably mounted.

Mounted on the threaded rod 44 is a threaded block 50 which is secured to a motor and tool carriage 51 and thus turning of the screw 44 by means of a wheel 52 being secured on one end thereof will move the motor carriage 51 along the trackways 23 and 24. This motor carriage has inturned lips 53 on each side thereof which project downwardly and inwardly and fit against the outer inwardly sloping surfaces of members 23 and 24. This permits the carriage 51 to be moved along the trackways 23 and 24 by turning of wheel 52 and its associated screw-threaded rod or worm shaft 44.

The motor carriage 51 has suitably secured thereto an electric motor 55 which has a vertically disposed shaft 56 therein and on the lower end of this motor shaft 56 there is adapted to be secured a suitable circular saw, this saw assembly comprising a chuck or socket 57 adapted to be secured to the lower end of motor shaft 56 by means of a set screw 58. This fitting or chuck 57 has an enlarged circular portion 60 having a central threaded opening 61 in which a screw 62 is threadably mounted which penetrates a central hole in a circular saw 63 and together with bolts 64 and 65 secure the saw to the portion 60. This screw 62 does not have a groove in its lower surface as it would interfere with the finish imparted to the upper surface of the meat block but has a slot 66 in its upper end by means of which the screw 66 can be turned relative to block 60 after the portion 58 has been removed from the motor shaft 56 (see Figure 7).

The carriage or motor carrying member 51 has a rectangular opening therethrough in which is mounted a suitable block 70 by means of set screws 71 and 72. This block has an upwardly extending barrel 74 in which is rotatably mounted a shaft 75 which has a disk 76 on its lower end having an abrasive covering such as emery cloth or sand paper 77 on its lower surface. The upper end of shaft 75 has a V-pulley 80 thereon with a V-belt 81 which is also mounted on a V-pulley 82 mounted on the upper end of motor shaft 56. This permits the surface back of the saw to be polished and smoothed over after the same has been cut by the saw 63.

Electric motor 55 is supplied with electrical current by a suitable drop cord 85 which passes through an eye member 86 on the end of arm 87 which is pivotally mounted as at 88 on the carriage frame 51 for supporting the drop cord a substantial distance above the machine and at a point where it will not get in the way of the mechanism or drop down on the table being operated upon.

*Method of operation*

The trackways or angle iron members 12 and 13 are suitably clamped on the opposed sides of the meat block at a point below where it is desired to saw the same and when the trackways are properly leveled, they are additionally secured by driving nails 16 through holes 17 to firmly secure the angle members 12 and 13 to the sides of the meat block. The carriage having the trackway carrying the saw and abrading tool is mounted on these trackways as they are attached to the meat block and the carriage carrying the electric motor and saw and abrading tool is moved up on one end of the trackways 12 and 13 and the carriage or motor frame 51 is moved all the way to the right in Figures 1, 2, and 3 to a point where the edge of the saw will not quite be in contact with the side of the meat block. This motor mount and saw will be positioned to the extreme right in Figures 1, 2, and 3 before the mechanism is assembled and attached to the meat block. The carriage carrying the motor frame is rolled to one end or the other of the trackways 12 and 13 and then by manipulating the screw 44, and while the saw is rotating, the saw is fed into the meat block to a depth, say, of about two inches and then with this setting held securely by the screw 44, the carriage having trackways 23 and 24 is moved to the right or to the left, depending upon which end of the trackway the saw is initially positioned, to cut say a two-inch groove all the way across the side of the meat block. Then by means of a suitable chisel and the like the sawed-off portions of the meat block are broken away and then another depth of cut all the way across the meat block, and this operation is repeated until the entire upper surface of the meat block has been gone over. After a few cuts of the saw the abrading tool comes into operation and proceeds to cleanse and polish the new surface which has been made by sawing off the top portions of the meat block. When the sawing has been completed, the frame 51 can be moved farther outwardly with the saw although it is located not to engage the meat block, but the abrading tool will engage the meat block in finishing up the polishing operation.

In the drawings and specification there has been set forth a preferred embodiment of the invention, and although specific terms are employed, they are used in a generic and descriptive sense only, and not for purposes of limitation, the scope of the invention being defined in the claim.

I claim:

Apparatus for re-surfacing meat blocks comprising a pair of angle irons each having a vertical web and a horizontal web, a pair of bolts penetrating the ends of the angle irons for clamping the vertical web of the angle irons to the sides of the meat block, a U-shaped bracket associated with each angle iron and having two rollers mounted in the vertical portions thereof for engaging the upper side of the horizontal web of the angle iron, each of said U-shaped members having a pair of brackets secured thereto, and provided with horizontal legs and a grooved wheel mounted in each leg for engaging the outer edge of the horizontal portion of the angle irons, the upper ends of the U-shaped members having secured thereto a pair of spaced angle bars extending above the meat block, and spanning the distance between the two U-shaped members, the last-named angle bars having a horizontal web which is secured to the U-shaped members and a vertical web, the remote sides of the vertical webs having each a bar secured thereto and extending the length of the last-named angle bars, each of said bars being broader at its top than at its bottom portion to form a dove-tailed trackway, a motor mount having a dove-tailed groove in its lower surface for engaging the bars secured on the remote sides of the last-named angle bars, a motor mounted on one side of said motor mount and having a downwardly projecting shaft, a cutter mounted on the shaft, a screw threaded rod having a hand wheel and being mounted on the upper portions of the U-shaped members and threadably engaging the motor mount for moving it along the last-named angle bars to move the cutting tool into engagement with a portion of the meat block, while the assembly comprising the U-shaped members and the last-named angle bars together with the motor mount is moved longitudinally of the first-named angle bars to cut away a portion of the meat block.

GEORGE L. COLEMAN.

REFERENCES CITED

The following references are of record in the file of this patent:

UNITED STATES PATENTS

| Number | Name | Date |
| --- | --- | --- |
| 682,999 | Reid | Sept. 17, 1901 |
| 875,736 | Rich | Jan. 7, 1908 |
| 1,218,780 | Lajeunesse | Mar. 13, 1917 |
| 1,231,625 | Lee | July 3, 1917 |
| 1,321,240 | Oliva et al. | Nov. 11, 1919 |
| 1,321,931 | McGramahan et al. | Nov. 18, 1919 |
| 1,326,829 | Arkland | Dec. 30, 1919 |
| 1,796,879 | Werber | Mar. 17, 1931 |
| 2,314,697 | Goff | Mar. 23, 1943 |